June 20, 1961 V. FINSTON 2,989,060
PLATING MACHINE AND CONVEYOR THEREFOR
Filed Sept. 12, 1956 6 Sheets-Sheet 1

Inventor
VICTOR FINSTON

June 20, 1961 V. FINSTON 2,989,060
PLATING MACHINE AND CONVEYOR THEREFOR
Filed Sept. 12, 1956 6 Sheets-Sheet 4

Inventor
VICTOR FINSTON

June 20, 1961  V. FINSTON  2,989,060
PLATING MACHINE AND CONVEYOR THEREFOR
Filed Sept. 12, 1956  6 Sheets-Sheet 5

Inventor
VICTOR FINSTON
by Hill, Sherman, Meroni, Gross & Simpson
Attys

2,989,060
Patented June 20, 1961

2,989,060
PLATING MACHINE AND CONVEYOR THEREFOR
Victor Finston, Chicago, Ill., assignor to The Meaker Company, Chicago, Ill., a corporation of Illinois
Filed Sept. 12, 1956, Ser. No. 609,454
12 Claims. (Cl. 134—77)

This invention relates to a processing machine, and particularly to a side arm type machine wherein the work is immersed in processing tanks or the like and is then raised vertically and transferred horizontally across the ends of adjacent tanks for lowering into the next succeeding tank or other station.

It is an object of the present invention to provide a novel processing machine.

It is a further object of the present invention to provide novel means for varying the treatment cycle of work units in a processing machine.

A further object of the present invention resides in the provision of a novel transfer system for a processing machine.

Still another object of the invention is to provide a novel delayed set down mechanism for processing machines.

A more specific object of the present invention resides in the provision of a novel electric control circuit for processing machines.

Other and further objects, features and advantages of the invention will be apparent from the following detailed description taken in conjunction with the accompanying drawings, in which.

As shown on the drawings.

Figure 1:
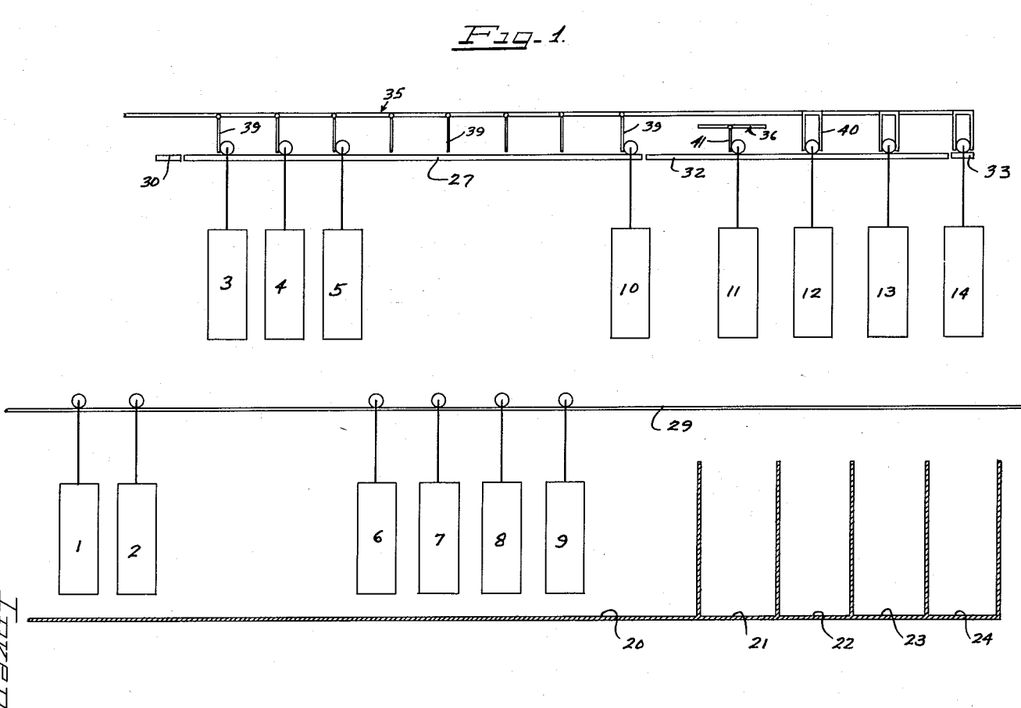
FIGURE 1 is a diagrammatic illustration of a processing machine in accordance with the present invention.
Figure 3:
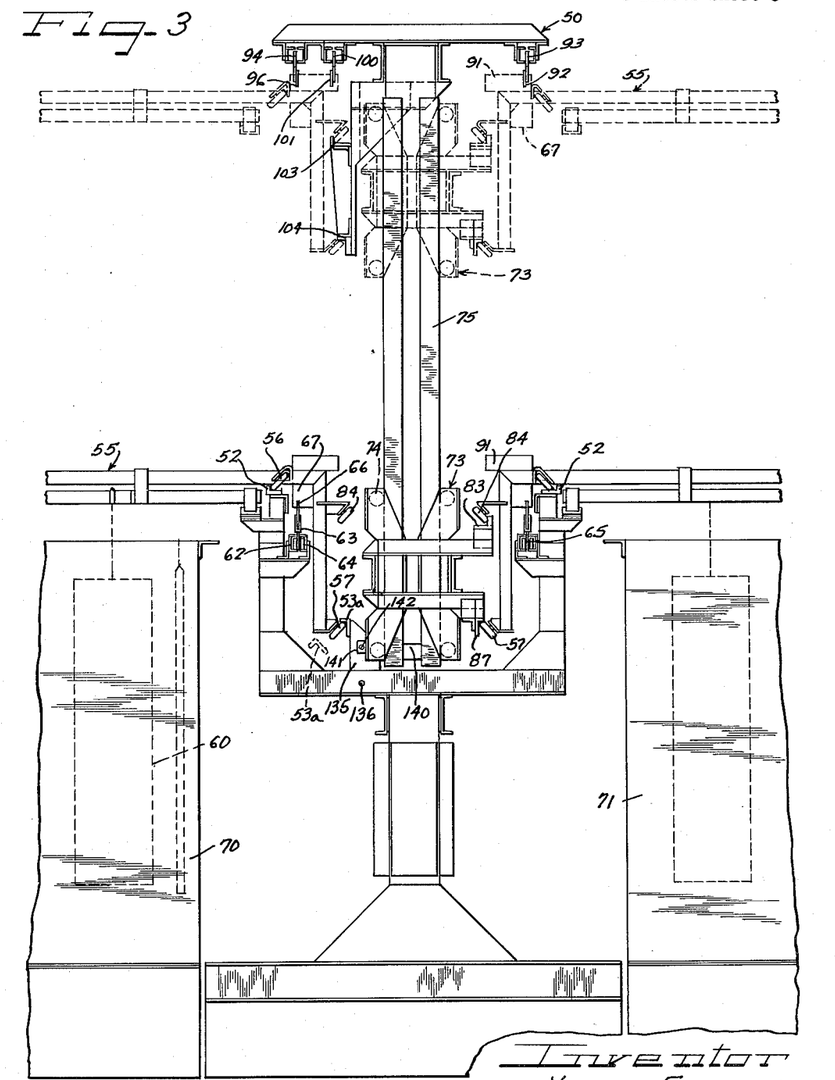
FIGURE 3 is a somewhat diagrammatic cross sectional view of the machine of FIGURE 1.

FIGURE 1 illustrates diagrammatically an embodiment of the invention wherein work units such as those designated 1 through 14 are to be moved through a plating tank or the like 20 and then into successive dip tanks such as 21, 22, 23 and 24. In the illustrated embodiment, work units 3, 4, 5 and 10 are illustrated as skipping the last half of the plating section 20 and for this purpose being supported on an upper fixed rail 27. Other work units such as 6, 7, 8 and 9 are illustrated as traveling through the last half of the plating section 20 on a lower fixed rail 29. An elevator track section 30 is illustrated as coinciding with the center of the plating section 20 for moving work units up to the upper fixed track section 27 where the work units are to skip the last half of the plating section 20. A further elevator section 32 is illustrated for removing work units from the end of the plating tank 20 and for raising work units from tanks 21, 22 and 23. A separate elevator section 33 is provided over tank 24 for delaying the lowering of the associated work unit into the tank 24 or otherwise altering the treatment time within the tank. The work units such as 1, 2, 6, 7, 8 and 9 may be moved along the lower rail 29 by means of a reciprocating lower shuttle conveyor which is shown in FIG. 3 and which will move the work units between successive treatment stations in the plating section 20. An upper shuttle is illustrated at 35 in its forward position, and this shuttle is operative to advance a work unit from the elevator section 30 onto the fixed rail 27 and to move the work units progressively along the fixed rail 27. A further conveyor section 36 is shown in its advanced position over the tank 21 and is operative to move work units either from the end of the fixed rail 27 or from the end of the elevator section 32 into position over the tank 21. The shuttle 35 may also advance work units between the tanks 21, 22, 23 and 24.

The general operation of the machine may now be outlined. After the conveyors 35 and 36 have advanced to the respective positions illustrated in FIGURE 1, the elevator sections 30 and 32 return to their lower position immersing work units 11, 12 and 13 in tanks 21, 22 and 23. Elevator section 33 may descend to an intermediate position and then may delay its lowering of the work 14 into tank 24 for a predetermined time period to shorten the length of treatment of the work unit 14 in the tank 24. After the expiration of this time period, elevator section 33 descends the remaining distance to immerse work unit 14 in the tank 24. The conveyor system including the lower shuttle and the upper shuttles 35 and 36 may retract after the elevator rail section 32 reaches lower position and the operating cycle may dwell for a predetermined period with the work units immersed in the respective tanks.

After the dwell period, the lower shuttle is advanced a part of its full stroke to move work unit No. 2 into alignment with the elevator section 30, while work units 6, 7, 8 and 9 are advanced one station in the tank 20. If it is desired to have the work unit 2 skip the last half of the plating section 20, the elevator section 30 will be made operative to raise the work unit, and elevator sections 30, 32 and 33 will be raised to move work units 2, 11, 12, 13 and 14 to upper position. The lower shuttle may now complete its advance stroke and the upper shuttles 35 and 36 also execute their advance stroke moving the work unit 2 off of the rail section 30 into the position shown for the work unit 3 in FIGURE 1, while the conveyor section 36 moves the work unit 10 along the elevator rail section 32 to the position shown for the work unit 11 in FIGURE 1. Work units 11, 12 and 13 will be moved by the upper conveyor 35 to positions over tanks 22, 23 and 24, respectively, while the work unit 14 may be advanced by other pushers of the conveyor 35 into a position over a further tank (not shown) or the like. The elevator sections may now lower as previously described and upon the next cycle of the machine the work unit 9 will be moved onto the elevator rail 32 during the first part of the advance stroke of the lower conveyor. When the elevator rail 32 is moved to raised position, the auxiliary shuttle 36 will be operative to move the work unit 9 into position over the tank 21. It will thus be seen that the system provides for a smooth feeding of work units to the tank 21 whether the work units arrive from the upper fixed track 27 or from the end of the plating section 20 and in whatever order they may arrive.

By way of specific example of the distances which may be involved, the work stations in the plating section 20 may have a twenty inch separation and the lower shuttle may have a stroke slightly greater than twenty inches. Pushers 39 on the shuttle 35 may have a spacing of 18¾ inches and the shuttle may have a 24 inch stroke. The auxiliary shuttle 36 may have a three foot stroke. Pushers 40 of shuttle 35 may have a 24 inch spacing to correspond to the separation between centers of tanks 21, 22 23 and 24. Pushers 39 of shuttle 35 and pusher 41 of shuttle 36 may be of the pivoted type as disclosed in my below-mentioned copending application, while pushers 40 may be fixed. In the illustrated embodiment, the position of each successive work unit must coincide at the station in plating tank represented by the work unit 2 in FIGURE 1 and at the station of the work unit 11 in FIGURE 1 whether the work units travel through the last half of the plating section 20 or are transferred along the fixed rail 27 above the plating tank. If eight stations in the plating tank 20 are to be skipped, this corresponds to a distance of 160 inches or 13 feet 4 inches from the position of the work unit 2 in FIGURE 1 to the center of the last station in the tank 20. The distance from the station in tank 20 to the station in tank 21 is 2 feet 10 inches to give a total distance of 16 feet 2 inches between work unit 2 and work unit 11 in FIGURE 1. The horizontal distance between work units 2 and 3 in FIGURE 1 is 10 inches corresponding to the first part of the advance stroke of the lower shuttle plus 18¾ inches or 2 feet 4¾ inches. The separation between work unit 3 and work unit 10 in FIGURE 1 corresponds to seven spaces or 10 feet 11.25 inches. This gives a total distance of 13 feet 4 inches between work unit 2 and work unit 10, leaving 2 feet 10 inches between work unit 10 and work unit 11 in FIGURE 1 which is just under the stroke of auxiliary shuttle 36.

Figure 2:
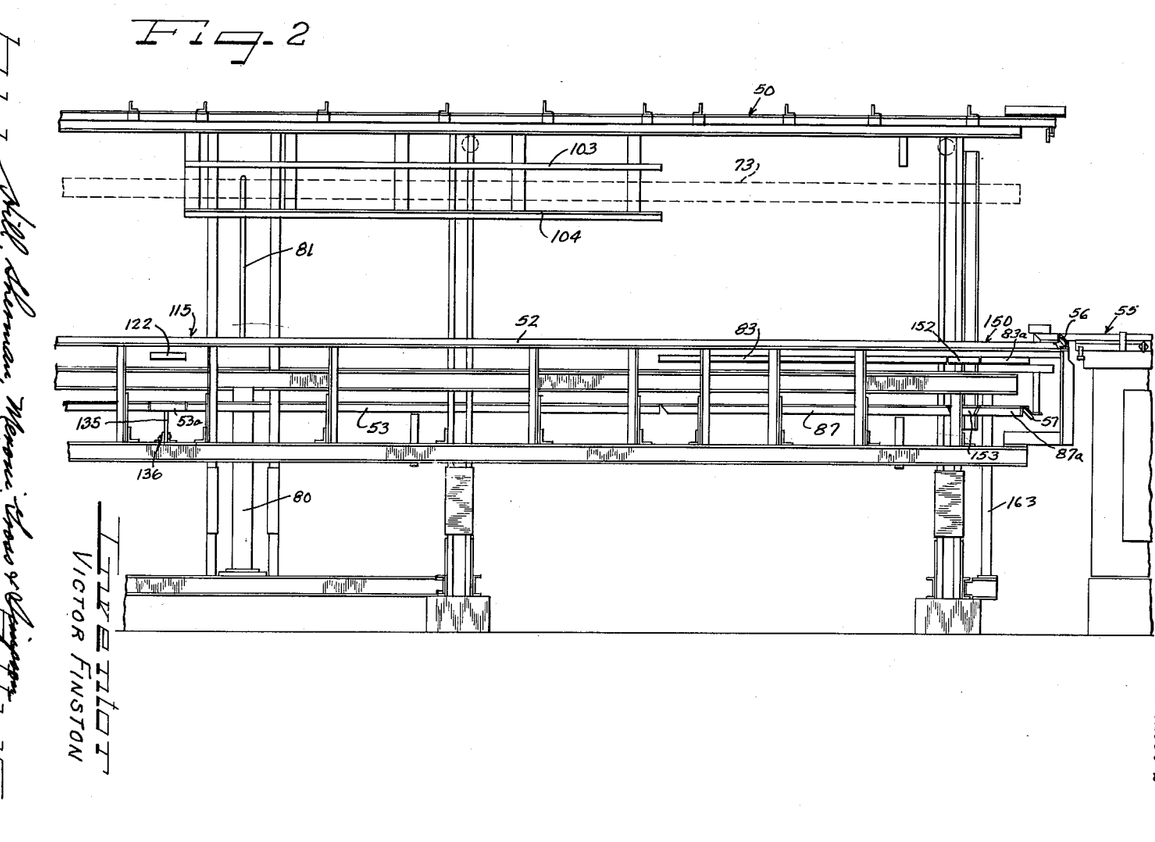
FIGURE 2 is a fragmentary side elevational view illustrating the detailed structure of a portion of the processing machine of FIGURE 1.

FIGURES 2 and 3 illustrate a processing machine to which the present invention is applicable, and such a processing machine is shown in greater detail in my copending application Serial No. 536,866, filed September 27, 1955, now Patent No. 2,869,560, dated Jan. 20, 1959, and entitled "Processing Machine and Method." The disclosure of Serial No. 536,866 is incorporated herein by reference. As seen in FIGURES 2 and 3, the machine comprises a framework 50 having fixed lower track portions such as 52 and 53 which serve to support work carriers 55 having wheels such as 56 and 57 riding on the fixed tracks. Work is suspended from the carriers as indicated at 60 in FIGURE 3. The lower shuttle reciprocates in fixed track portions 62 and comprises a body portion 63 having rollers such as 64 riding on the tracks 62 and having pivotal pusher lugs such as 66 for engaging flanges such as 67 on the work carriers 55 to advance the work carriers in the forward direction of movement of the shuttle. On retraction of the shuttles, the pushers 66 pivot under the flanges 67 to be ready to engage behind the next succeeding work carrier on the next succeeding advance stroke of the shuttle.

The work may travel in an orbital path about a central longitudinal framework with tanks such as indicated at 70 and 71 located on opposite sides of the longitudinal framework.

For elevating the work carriers in transfer between tanks, the frame 50 mounts a vertically reciprocal elevator frame 73, FIGURE 3, which rides by means of rollers such as 74 on vertical guide ways such as 75. A cylinder 80 and piston 81 are illustrated in FIGURE 2 for vertically reciprocating the elevator frame 73 and the piston may be coupled to the elevator frame by means of chains (not shown) extending over sprockets carried at the top of the framework and connected to the elevator frame so that as the piston is retracted, the elevator frame is raised. The upper sprockets may be coupled to chain loops at opposite ends of the framework by line shafts, so as to raise an elevator frame extending for substantially the length of the machine by means of the single cylinder and piston. The elevator frame 73 carries track sections 83 for engaging rollers 84 on the carriers 55 and carries lower track sections 87 which fit between fixed track sections 53.

In upper position of the work carriers as indicated in outline in FIGURE 3, flanges 91 are engaged by pushers such as indicated at 92 of upper shuttles 93 and 94 and shuttles 93 and 94 may be connected together in a horizontal loop as may the lower shuttles 63 and 65. The shuttle 94 may correspond to the skip shuttle 35 of FIGURE 1 with pivotal lugs 96 and rigid pusher lugs 92. The rigid pusher lugs 92 may engage on opposite sides of the flange 91 to rigidly position the work carrier in a given position and may be flared downwardly so as to guide the flanges 91 into engagement between the tines of each lug as the elevator is raised. Shuttle 100 in FIGURE 3 may correspond to the auxiliary shuttle 36 in FIGURE 1 and have a single pivotal pusher lug 101 for engaging an inner portion of the same flange 91 on the work carriers. Reference numerals 103 and 104 represent the fixed track corresponding to the track 27 diagrammatically indicated in FIGURE 1 for carrying the work carriers above the last half of the plating section of the machine in skip operation. The rail sections 103 and 104 are thus fixed to the framework 50 of the machine.

Figure 4:
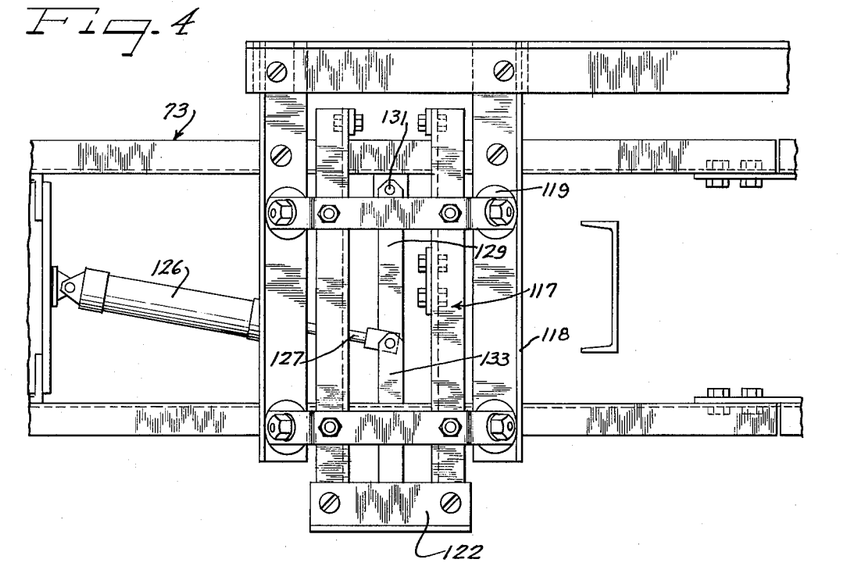
FIGURE 4 is a fragmentary horizontal plan view illustrating a portion of the skip transfer mechanism of the machine of FIGURE 1.
Figure 5:
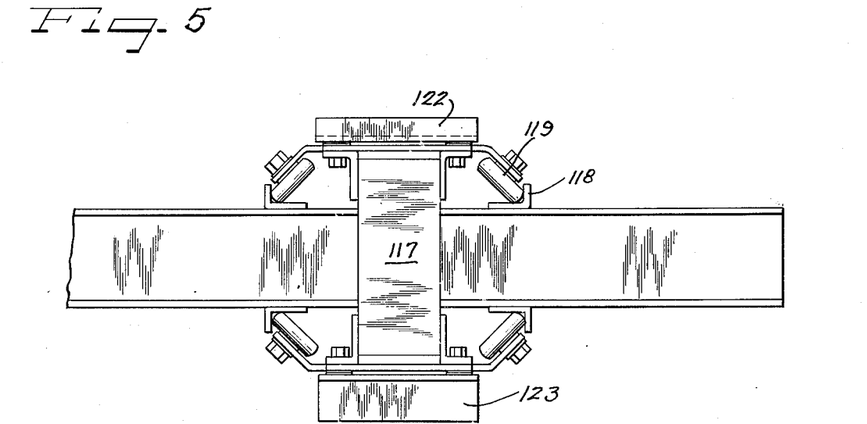
FIGURE 5 is a fragmentary side elevational view of the structure of FIGURE 4.

In order to selectively raise work carriers to the fixed tracks 103 and 104 in FIGURE 2, means is provided at a station indicated at 115 in FIGURE 2 for selectively engaging the work carriers and elevating the same with the elevator frame 73. This structure is shown in greater detail in FIGURES 4 and 5 and comprises a skip carriage 117 carried on the elevator frame 73 and laterally shiftable relative thereto by means of tracks 118, and rollers 119 on the skip carriage 117 riding in said tracks. In FIGURES 4 and 5, the carriage 117 is illustrated in its projected position wherein upper track portion 122 would be in a position corresponding to the position of the elevator track section 83 in FIGURE 3 to engage roller 84 of a work carrier as station 115 in FIGURE 2. Similarly, lower skip track section 123 would be in a position exactly corresponding to track section 87 in FIGURE 3 to receive rollers 57 of a work carrier. The skip carriage 117 is retracted by means of a cylinder 126 having its piston rod 127 pivotally connected to a link member 129 secured to elevator frame 73 on a pin 131 and pivotally secured to a link 133 which in turn is pivotally connected to the skip carriage 117. Thus as the piston rod 127 is retracted, the skip carriage 117 will be moved inwardly to retract track sections 122 and 123 out of the path of the work carriers.

In case work carriers are not to skip the last part of the plating tank, a lower pivotal track section 53a seen in FIGURES 2 and 3 is pivoted into alignment with lower fixed track 53 to provide a continuous lower track for the rollers 57 of the work carriers. As seen in FIGURE 3, the pivotal track section 53a is carried on a mounting plate 135 which is pivoted at 136 to the framework to move between the solid operative position shown in FIGURE 3 and the dotted inoperative position for accommodating skip transfer of the work carrier. A cylinder 140 indicated in FIGURE 3 may have its piston 141 pivotally connected to the mounting plate 135 as indicated at 142 for moving the track section 53a between its operative and inoperative positions.

Figure 6:
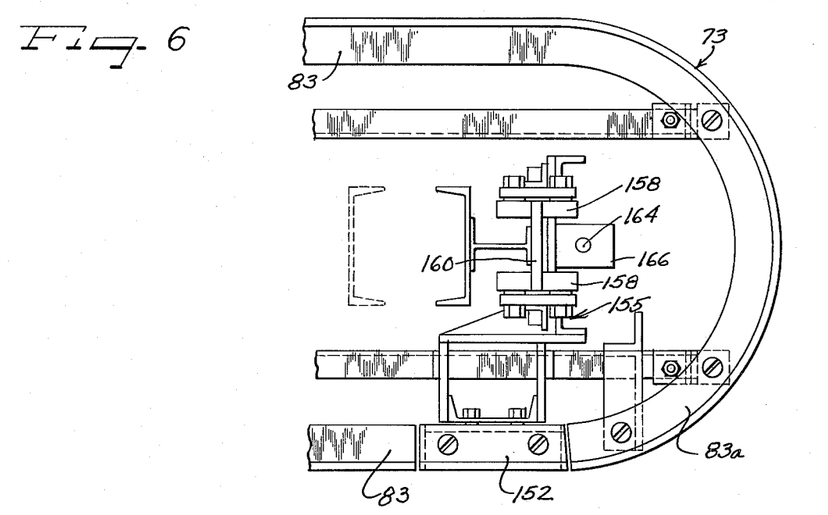
FIGURE 6 is a fragmentary plan view of a portion of the delayed set down mechanism of the machine of FIGURE 1.
Figure 7:
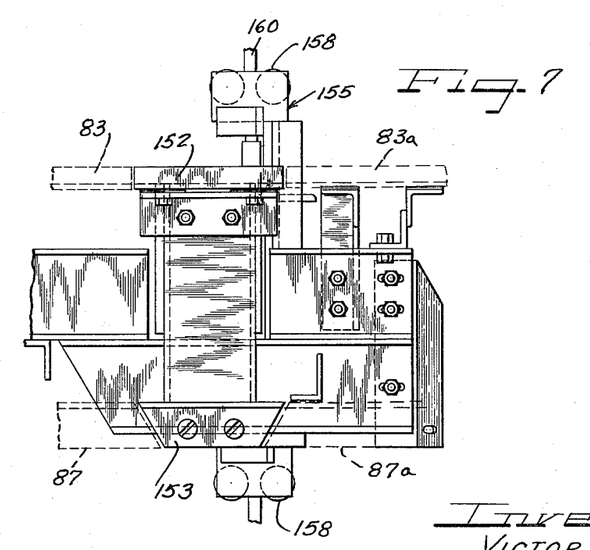
FIGURE 7 is a fragmentary side elevational view of the structure of FIGURE 6.

For reducing the processing time at a station 150 indicated at FIGURE 2, a portion of the elevator frame 73 may be independently movable, for example to delay set down of a work carrier at the station 150 for a predetermined time period after the elevator frame proper is in lower position. FIGURES 6 and 7 illustrate a suitable mechanism in detail. Such mechanism may comprise elevator rail sections 152 and 153 mounted on a carriage 155 for vertical movement independent of the main elevator frame 73. When the elevator frame and delayed set down carriage 155 are at the same level, the track section 152 forms a continuation of the track 83 of the elevator frame which is illustrated as having a curved section 83a joining straight sections 83 on sides of the machine. Similarly, the track section 153 forms a continuation of the elevator lower track section 87 and of a corresponding curved elevator track section 87a. The delay set down carriage 155 carries rollers such as 158 riding on a vertical guide plate 160 for guiding the vertical movement of the track sections 152 and 153. For actuating the delayed set down carriage 155 independently of the remainder of the elevator frame, a separate hydraulic cylinder 163, FIGURE 2, is provided having its piston rod 164, FIGURE 6, connected to a bracket 166 on the set down carriage 155.

Electric control circuit

Figure 8:
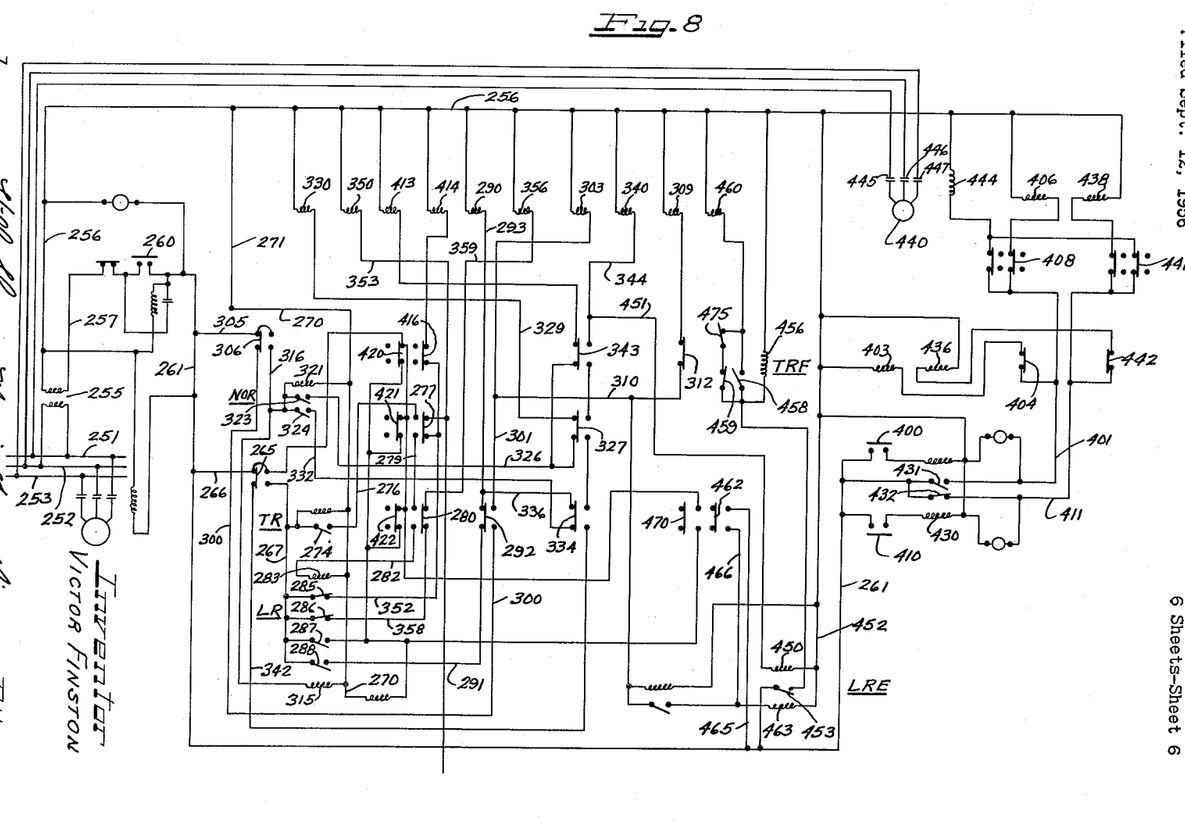
FIGURE 8 is a schematic illustration of the electric control circuit for the machine of FIGURE 1.

In FIGURE 8 the reference numerals 251, 252 and 253 designate a 440 volt three-phase 60 cycle line which supplies current to the various motors of the machine. Lines 251 and 252 energize a transformer 255 to supply control current to lines 256 and 257. When start button 260 is depressed voltage is supplied to supply line 261 to energize the circuit. If the main elevator frame 73 is in its lower position, contact 265 will be in its right hand position to energize timing relay TR through the following circuit: Line 261, line 266, contact 265, line 267, coil 268 of timing relay TR, line 270, line 271 and control current supply line 256.

When the timing relay TR times out, contact 274 is closed to latch relay LR providing the top and bottom shuttles are in their returned positions, the circuit extending as follows: Line 266, contact 265, line 267, contact 274, line 276, contact 277 of the top shuttle limit switch, line 279, contact 280 of the bottom shuttle limit switch, line 282, latch coil 283 of relay LR, and line 270.

Latching of relay LR opens contacts 285 and 286 and closes contacts 287 and 288. Closure of contact 288 energizes the bottom shuttle forward winding 290 through the following circuit: Line 261, line 266, contact 265, line 267, contact 288, line 291, contact 292 of bottom shuttle midposition limit switch, line 293, forward coil 290, and line 256 to cause the bottom shuttle to advance to a midposition whereupon contact 292 interrupts the circuit between lines 291 and 293 and closes a circuit between lines 300 and 301 to energize the main elevator up coil 303 through the following circuit: Line 261, line 305, contact 306 of main elevator upper position limit switch, line 300, contact 292 of bottom shuttle midposition limit switch, line 301, up coil 303 and line 256.

The delay set-down elevator up coil 309 is also energized from line 301 through line 310, contact 312 of delay set-down up position limit switch, coil 309 and line 256.

When the main and set-down elevators reach their up positions, contacts 306 and 312 interrupt the raising circuits. Unlatch coil 315 of relay LR is now energized through the following circuit: Line 261, line 305, contact 306, line 316, unlatch coil 315, line 270, line 271 and line 256.

Relay NOR is also energized from line 316 through coil 321 and line 270 to close contacts 323 and 324. Closure of contact 323 energizes the top shuttle through the following circuit: Line 316, contact 323, line 326, contact 327 of top shuttle forward position limit switch, line 329, forward coil 330 of the top shuttle and line 256.

Closure of contact 324 energizes the bottom shuttle to complete its stroke through the following circuit: Line 316, contact 324, line 332, contact 334 of bottom shuttle forward position limit switch, line 336, line 293, and bottom shuttle forward coil 290.

When the top and bottom shuttles reach their forward positions, contacts 327 and 334 of the respective limit switches are actuated to energize down coil 340 of the main elevator through the following circuit: Line 261, line 266, contact 265, line 342, contact 334 of bottom shuttle forward limit switch, contact 327 of top shuttle forward limit switch, contact 343 of the forward position limit switch of auxiliary shuttle 100 (FIG. 3), line 344 and down coil 340 of the main elevator.

When the main elevator reaches its down position, the basic cycle is completed, and the circuit is ready to again energize the timing relay TR to recycle. When the main elevator reaches its lower position, return coil 350 of the top shuttle is energized through the following circuit: Line 261, line 266, contact 265 of main elevator down position limit switch, line 267, contact 285, line 352, contact 277 of top shuttle return position limit switch, line 353, and return coil 350 of the top shuttle.

The bottom shuttle return coil 356 is energized through the following circuit: Line 261, line 266, contact 265, line 267, contact 286, line 358, contact 280 of bottom shuttle return limit switch, line 359, and reverse coil 356 of the bottom shuttle.

Skip transfer electric circuit

When it is desired to cause operation of the skip mechanism of the present invention to shorten the treatment period in a plating tank or the like, a skip button 400 is depressed supplying line voltage to a line 401 which energizes the forward coil of 403 of the stationary skip rail cylinder 140 of FIGURE 3 to move the rail segment 53a in FIGURE 3 to its dotted position. When the rail 53a reaches its inoperative dotted position in FIGURE 3, limit switch contact 404 is actuated to deenergize the coil 403. Simultaneously the forward coil 406 of the elevator skip rail cylinder 126 seen in FIGURE 4 is energized to project the rails 122 and 123 shown in FIGURES 4 and 5 into their operative position. When the rails are fully projected, elevator skip forward limit switch contact 408 is actuated to deenergize the forward coil 406. The skip mechanism will remain in operative position until the full tank run button 410 is depressed which supplies current to line 411.

During operation of the machine, the top auxiliary shuttle forward coil 413 and reverse coil 414 are energized along with the top shuttle coils 330 and 350 respectively, and limit switch contacts 416 and 343 operate in the same manner as the top shuttle limit switch contacts 277 and 327. Contacts 420, 421, and 422 are operated in synchronism respectively with contacts 416, 277 and 280; their function need not be further described herein.

When the full tank run button 410 is closed, unlatch coil 430 is actuated to open contact 431 and close contact 432, thereby energizing reverse coil 436 of sationary skip rail cylinder 140 and reverse coil 438 of elevator skip rail cylinder 126 to restore the machine to non-skip operation. Reference numeral 440 designates a motor for operating a pump associated with cylinders 126 and 140. Contact 441 opens when the elevator skip rails 122 and 123 are retracted, while limit switch contact 442 opens when the stationary skip rail 53a is returned to its operative position as part of stationary rail 53. Relay coil 444 controls normally open contacts 445, 446 and 447 in the energizing circuit for motor 440.

Delay set down electric circuit

It will be observed that when the main elevator down coil 340 is energized, latch coil 450 of relay LRE is also energized from line 344 through line 451, latch coil 450 and line 452 closing contact 453 of relay LRE. Closure of contact 453 energizes coil 456 of timing relay TRF. After timer relay TRF has timed out, contact 458 is closed and contact 459 is opened to energize the down coil 460 of delay set down elevator cylinder 163. This causes the delay set down elevator to lower its work after a predetermined time delay with respect to the operation of the main elevator.

When the delay set down elevator reaches its lower position, contact 462 is closed to energize unlatch coil 463 of relay LRE from line 261, through line 465, contact 462, line 466, unlatch coil 463 and line 452. This opens contact 453 to deenergize down coil 460. When the delayed set down elevator reaches its down position, contact 470 is actuated for a purpose not herein described.

It will be observed that because of the normally closed contact 475 of the delay set down midposition limit switch, the down coil 460 will be energized with the main elevator down coil 340 until the delay set down elevator reaches an intermediate position, for example half way down so as to enable the top shuttle to return clear of the work carrier on the delay set down elevator in all cases. The timing relay TRF may control the dwell of the delay set down elevator in this mid position.

*Summary of operation*

When it is desired to cause work carriers to skip a portion of the plating tank, button 400 is depressed, FIGURE 8, to swing lower rail section 53a, FIGURE 3, to its inoperative position and to project rail sections 122 and 123, FIGURES 4 and 5, into position to elevate work carriers when the elevator frame 73 is next raised. The carriers are then transferred onto the fixed upper rails 103 and 104 and are moved along these upper rails in suitable steps so as to be transferred by the auxiliary shuttle 100 into the proper position on the elevator 73 for immersion in the subsequent dip tank or the like. The stroke of the auxiliary shuttle 100 is sufficient to either transfer work carriers from the fixed rails 103 and 104 to the proper position on the elevator rails 83 and 87, or to shift the carrier being transferred from the end of the plating tank to this same position on the elevator rails 83 and 87 as described in connection with the diagrammatic illustration of FIGURE 1.

The delay in set down of the delay set down elevator rail sections 152 and 153 in FIGURES 6 and 7 is accomplished by adjusting the timing of relay TRF in FIGURE 8. The delay set down elevator is lowered to an intermediate height position with the remainder of the elevator frame, and delays in this mid position under the control of timer TRF. At its mid position, the upper shuttle is free to return. By proper setting of the timing, work may entirely skip the tank associated with the delay set down mechanism.

It will be apparent that many modifications and variations may be effected without departing from the scope of the novel concepts of the present invention.

I claim as my invention:

1. In a processing machine for advancing work carriers through a series of processing stations, a framework for extending adjacent said series of stations, lower carrier supporting means mounted on said framework at a lower level for supporting work carriers at respective work stations, lower conveyor means mounted on said framework and cyclically movable to advance work carriers along said lower carrier supporting means between work stations, elevator frame means mounted on said framework for cyclical vertical reciprocation between a lower position and an upper position and having elevator rail means for vertically moving work carriers to an elevated position for transfer along said elevator rail means, selectively operable elevator rail means mounted for vertical reciprocation in unison with said elevator frame means and selectively movable to an operative position to move a work carrier between a lower position and an upper position, upper rail means mounted on said framework at an upper level for alignment with said elevator rail means at one end and with said selectively operable elevator rail means at the other end, upper conveyor means mounted on said framework and cyclically movable to advance work carriers along said selectively operable elevator rail means and said upper rail means to a first transfer position, auxiliary upper conveyor means mounted on said framework and cyclically operable to advance work carriers between said first transfer position on said upper rail means and a common position along said elevator rail means, said lower conveyor means being operative to move carriers onto a second transfer position on said elevator rail means, and said auxiliary upper conveyor means being operable in upper position of said elevator rail means to advance work carriers from said second transfer position on said elevator rail means to said common position on said elevator rail means.

2. In a processing machine for advancing work carriers through a series of processing stations, a framework for extending adjacent said series of stations, lower rail means mounted on said framework at a lower level for supporting work carriers at the respective work stations, lower conveyor means mounted on said framework and cyclically operable to advance work carriers along said lower rail means between successive stations, upper rail means mounted on said framework at an upper level and extending above a portion of said lower rail means for supporting work carriers above said stations, upper conveyor means mounted on said framework and cyclically operable to advance work carriers along said upper rail means to a first transfer position thereon, means selectively operable for raising a work carrier from said lower rail means to said upper rail means, elevator means mounted on said framework for vertical reciprocation and having elevator rail means for receiving work carriers from said lower rail means in lower position thereof at a second transfer position and for receiving work carriers from said upper rail means in upper position thereof, said lower conveyor means being operative to advance work carriers to said second transfer position on said elevator rail means in lower position of the elevator rail means, and auxiliary shuttle means mounted on said framework at an upper position and having pusher means operative to advance a work carrier at said first transfer position on said upper rail means to a common position on said elevator rail means and operative to advance a work carrier at said second transfer position on said elevator rail means to said common position on said elevator rail means in upper position of said elevator rail means, whereby work carriers are transferred from either said upper or lower rail means to said common position on said elevator rail means.

3. In a processing machine for advancing work units through a series of processing stations, a framework extending along said series of stations, lower rail means mounted on said framework and comprising a first continuous lower rail section extending continuously along said series of stations and a second lower rail section having a movable segment adjacent a first transfer position and having a gap therein adjacent a second transfer position, work carriers having first means riding on said first rail section to support the weight of the work units carried thereby and having second means riding on said second rail section to resist turning moments exerted by the work units on the carriers and having third means operative in conjunction with said second means to support the work carriers in elevated position, lower conveyor means mounted on said framework for advancing work carriers along said lower rail means and for advancing work units to said first and second transfer positions, an elevator frame mounted on said framework for vertical reciprocation and having first elevator rail means adjacent said first transfer position and movable between an operative and an inoperative position and having second elevator means adjacent said second transfer position, said first elevator rail means comprising a first elevator rail section for engaging said third means of a work carrier and a second elevator rail section for replacing said movable segment of said lower rail means in operative position of said first elevator rail means to engage said second means of a work carrier, upper rail means mounted on said framework at an upper level above said lower rail means comprising a first upper rail section for alignment with said first elevator rail section and a second upper rail section for alignment with said second elevator rail section for receiving work carriers from said first elevator rail means in upper position of the elevator frame, said second elevator rail means comprising a third elevator rail section for alignment with said first upper rail section and for supporting said third means of work carriers and a fourth elevator rail section for alignment with said second upper rail section in upper position of the elevator frame and for occupying the gap in said second lower rail section adjacent said second transfer position, upper conveyor means mounted on said framework for advancing work carriers along said first elevator rail means and said upper rail means and second elevator rail means, and means for selectively moving said first elevator rail means to operative position and said lower rail means movable segment to an inoperative position to elevate work carriers at said first transfer position to said upper rail means and to move said first elevator rail means to inoperative position to accommodate movement of work carriers along said second rail means to said second transfer position.

4. In a processing machine for advancing work units through a series of processing stations, means defining a first common path, first and second branch paths in parallel and a second common path; conveyor means for advancing work units from a first common position on said first common path selectively along said first and second branch paths and then to a second common position on said second common path; said conveyor means comprising first means for advancing work units a first distance from said first common position to a first transfer position, selectively operable transfer means engageable with work units at said first transfer position to move the work units along said second branch path, means for advancing work units from said first transfer position along said first path through successive stations, means for advancing work units along said second path in steps to a second transfer position in alignment with said second common path, second means for moving work units from a last station along said first path a distance equal to said first distance to a third transfer position and operating in unison with said first means, transfer means operable to move work units from said third transfer position to a fourth transfer position in alignment with said second transfer position and said second common path, and means for moving successively past said second and fourth transfer positions to engage work units at said second and fourth transfer positions and to advance said work units to said second common position on said second common path.

5. The machine of claim 4 wherein said selectively operable transfer means comprises a vertically reciprocable elevator having transversely shiftable rail means for moving into engageable relation to work units at said first transfer position.

6. The machine of claim 4 wherein said last mentioned means comprises a horizontally reciprocal pusher having a stroke at least equal to the distance between said second transfer position and said second common position.

7. The machine of claim 4 wherein said first means comprises a horizontally reciprocal lower conveyor having a work stroke at least equal to the distance between successive stations and means for advancing said lower conveyor means through each stroke in two parts the first of which is at least equal to said first distance, and said means for moving successively past said second and fourth transfer positions, and said means for advancing work units from said first transfer position along said first path and said means for advancing work units along said second path also comprising reciprocating conveyors with pivotal pusher means.

8. In a processing machine for advancing work units through a series of processing stations, a framework, reciprocating conveyor means mounted on said framework for reciprocating movement at a fixed level and having pusher means for engaging work units to advance the same between processing stations, elevator means mounted on said framework for vertical reciprocation and having means for engaging a work unit at a transfer position along said conveyor means to disengage the work unit from said conveyor means and move the work unit to a remote position, means for actuating said elevator means after an advance of said conveyor means to move the work unit at the transfer position to an intermediate position between the transfer position and said remote position, means for thereafter retracting the conveyor means, and means for thereafter actuating the elevator means to continue movement of the work units to said remote position.

9. In a processing machine for advancing work units through a series of processing stations, a framework, conveyor means mounted on said framework for movement at a fixed level and having pusher means for engaging work units to advance the same between processing stations, elevator means mounted on said framework for vertical reciprocation and having means for engaging a work unit at a transfer position along said conveyor means to disengage the work unit from the conveyor means and to move the work unit to a remote position, means for actuating said elevator means after an advance of said conveyor means to move the work unit towards said remote position, limit switch means responsive to the work unit reaching an intermediate position between said transfer position and said remote position to interrupt actuation of said elevator actuating means, and timer means controlling a contact in parallel with said limit switch means to reactuate the elevator actuating means after a predetermined time period to continue movement of the work unit toward said remote position.

10. In an electroprocessing machine, an elongated plating tank, a continuous lower work carrier supporting rail extending along the length of said tank for supporting work carriers for movement from one end of the tank to the other, lower conveyor means for moving work carriers along said lower rail between a succession of stop positions on said lower rail including an intermediate stop position between the ends of said plating tank, work carriers having first means for riding on said lower rail and having second means for supporting work carriers spaced horizontally from said lower rail, and an elevator frame having an elevator rail horizontally movably mounted on said elevator frame at a position in alignment with said intermediate stop position and movable from a retracted position horizontally spaced from said second means of work carriers on said lower rail to an operative position for vertical alignment with the second means of a work carrier at said intermediate stop position on said lower rail, and means for selectively moving said elevator rail from its retracted position to its operative position to engage the second means of a work carrier moved to said intermediate stop position by said lower conveyor means to selectively raise said work carrier from said plating tank intermediate the ends thereof, said elevator frame having four parallel horizontal tracks fixed thereto and extending at right angles to said lower rail, and a subframe having rollers engaging said four horizontal tracks for movement therealong and supporting said elevator rail for movement from said retracted position to said operative position.

11. In an electroprocessing machine, an elongated plating tank, a first continuous lower work carrier supporting rail extending along the length of said tank for supporting work carriers for movement from one end of the tank to the other, a second lower work carrier engaging rail below said first lower rail and having a gap at an intermediate stop position intermediate the ends of said plating tank, lower conveyor means for moving work carriers along said lower rail between a succession of stop positions on said lower rail including said intermediate stop position, work carriers having first and second means for riding on said first and second lower rails and having third means for supporting said work carriers spaced horizontally from said first lower rail, a movable track section for fitting in said gap in said second lower rail, stationary framework means supporting said first and second lower rails and movably mounting said track section for movement from an operative position occupying said gap to an inoperative position away from said gap, an elevator frame having a first elevator rail horizontally movably mounted on said elevator frame at a position in alignment with said intermediate stop position and movable from a retracted position horizontally spaced from said third means of work carriers on said lower rail to an operative position for vertical alignment with the third means of a work carrier moved to said intermediate stop position by said lower conveyor means, said elevator frame having a second elevator rail movable from a retracted position to an operative position occupying said gap in said second lower rail, and means for selectively moving said first and second elevator rails to operative position and for concurrently moving said movable track section to inoperative position to condition the elevator rails to raise work carriers from said plating tank intermediate the ends thereof.

12. In a processing machine, an elongated plating tank for receiving a series of work units, a frame work extending adjacent said tank, elongated continuous rail means extending for the length of said tank between the ends thereof, lower conveyor means mounted on said framework at a fixed level and operable to advance work carriers supported on said lower rail means through a succession of stop positions from one end of said tank to the other end of said tank, elevator frame means mounted on said framework for cyclical vertical reciprocation and having elevator rail means for lifting work carriers at said other end of said tank, selectively operable elevator rail means mounted for vertical reciprocation in unison with said elevator frame means and disposed in alignment with an intermediate stop position between the opposite ends of said tank and selectively movable to an operative position to lift a work carrier above said tank to an upper position with its work free of said tank, upper rail means mounted on said framework at an upper level aligned at one end with the upper position of said selectively operable elevator rail means and aligned at the other end with the upper position of said elevator rail means and extending above a length of said tank at a level above said lower rail means, upper conveyor means mounted on said framework and cyclically movable to advance work carriers along said selectively operable elevator rail means and said upper rail means to a first transfer position, auxiliary upper conveyor means mounted on said framework and cyclically operable to advance work carriers between said first transfer position on said upper rail means and a common position along said elevator rail means, said lower conveyor means being operative to move carriers onto a second transfer position on said elevator rail means, and said auxiliary upper conveyor means being operable in upper position of said elevator rail means to advance work carriers from said second transfer position on said elevator rail means to said common position on said elevator rail means, said auxiliary upper conveyor means comprising a reciprocating pusher lug moving over a path from said first transfer position across said second transfer position to said common position and operable to engage a carrier either at said first transfer position or said second transfer position and move the same to said common position in each cycle thereof.

References Cited in the file of this patent

UNITED STATES PATENTS

| | | |
|---|---|---|
| 2,048,937 | Larson | July 28, 1936 |
| 2,214,262 | Van Winkle Todd | Sept. 10, 1940 |
| 2,654,462 | Todd | Oct. 6, 1953 |
| 2,716,415 | Davis et al. | Aug. 30, 1955 |
| 2,851,044 | Davis | Sept. 9, 1958 |

FOREIGN PATENTS

| | | |
|---|---|---|
| 483,043 | Italy | July 13, 1953 |